United States Patent [19]
Chirico

[11] 4,084,945
[45] Apr. 18, 1978

[54] ENTRAINMENT SEPARATOR APPARATUS

[75] Inventor: Anthony N. Chirico, Short Hills, N.J.

[73] Assignee: Ecodyne Corporation, Lincolnshire, Ill.

[21] Appl. No.: 710,945

[22] Filed: Aug. 2, 1976

[51] Int. Cl.² .............................................. B01D 19/00
[52] U.S. Cl. .......................................... 55/38; 55/90
[58] Field of Search ......... 55/36, 38, 39, 80, 183–188, 55/259, 434, 90

[56] References Cited

U.S. PATENT DOCUMENTS

| | | | |
|---|---|---|---|
| 2,788,080 | 4/1957 | Guarin | 55/186 X |
| 3,119,674 | 1/1964 | Glasgow et al. | 55/80 X |
| 3,208,204 | 9/1965 | Persson | 55/186 X |
| 3,626,672 | 12/1971 | Burbidge | 55/185 |
| 3,721,069 | 3/1973 | Walker | 55/434 X |

FOREIGN PATENT DOCUMENTS

| | | | |
|---|---|---|---|
| 2,020,871 | 11/1971 | Germany | 55/38 |
| 4,633,671 | 4/1971 | Japan | 55/38 |

OTHER PUBLICATIONS

The Demister, Otto H. York Co., Inc., Bulletin 41, Apr. 1970.

Primary Examiner—Thomas G. Wyse
Assistant Examiner—Robert H. Spitzer
Attorney, Agent, or Firm—Joel E. Siegel; Charles M. Kaplan

[57] ABSTRACT

A liquid-gas separator may be used with a liquid concentrator for returning entrained liquid. The separator employs serially arranged mesh pads of different cross-sectional areas. The largest pad is closest to the liquid-gas inlet, and the smallest pad is closest to the gas outlet.

2 Claims, 1 Drawing Figure

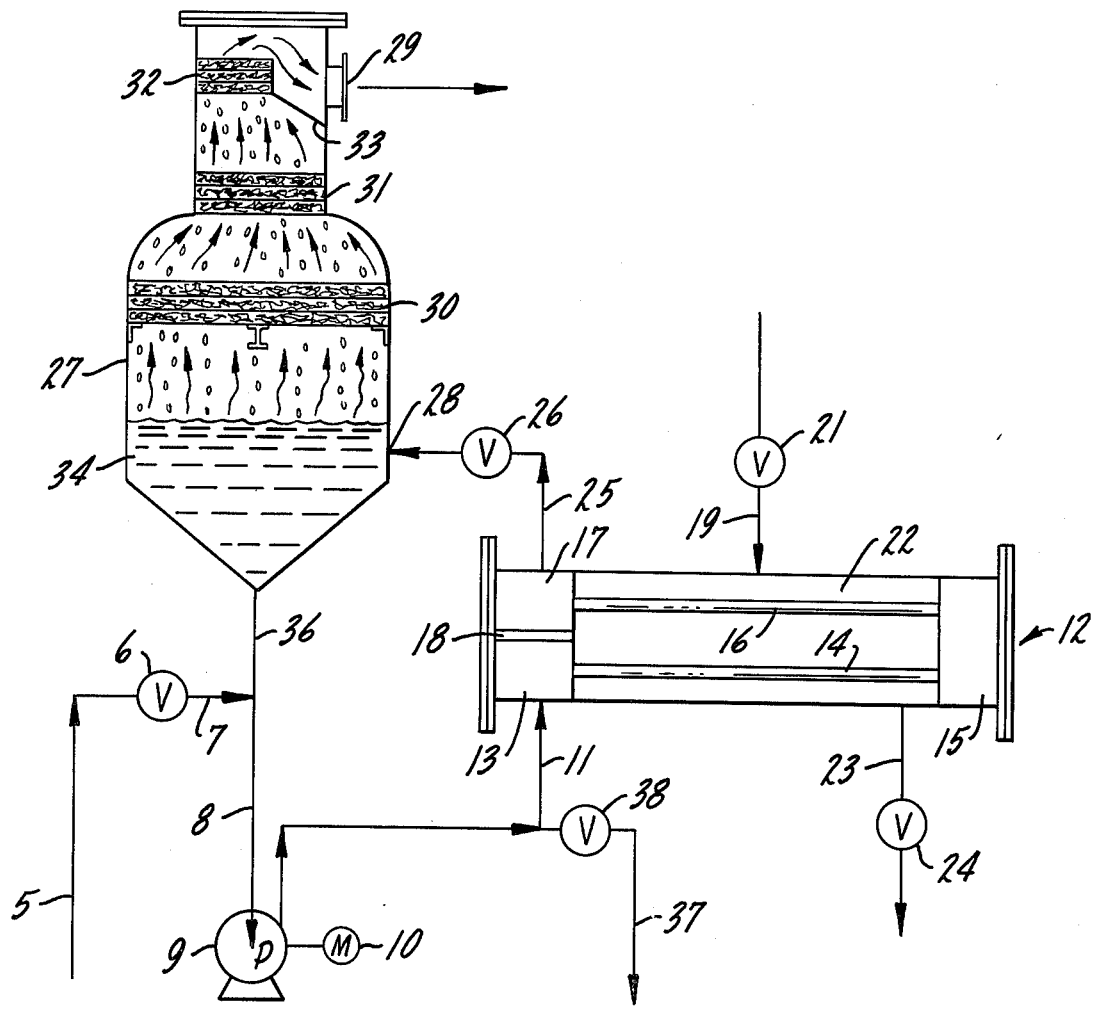

ENTRAINMENT SEPARATOR APPARATUS

BACKGROUND OF THE INVENTION

Liquids can be concentrated by boiling off essentially pure steam and recovering the remaining residue. When the steam is to be used in a subsequent part of the system (e.g., as boiler feed), any contaminant or corrosive salts dissolved in water droplets entrained in the steam must be removed. Also, when the liquid contains a dangerous substance or pollutant, entrained droplets must not be allowed to escape with the steam. For example, nuclear generation of electric power produces radioactive liquid wastes. Since the water component is by far the largest volume of such wastes, it is necessary to remove all traces of radioactivity before the water is discharged. One method is to concentrate the radioactive wastes by evaporation of the water and then decontamination of the water vapors by separation of any entrained radioactive liquid droplets. Attempts have been made to separate radioactive water droplets from steam by coalescing of the liquid on separator components. Such separators operate efficiently only when the steam flows within some predetermined narrow velocity range. If the steam velocity strays outside such a range, the separator permits so much radioactive water to escape that whatever receives the steam vapors downstream will be seriously contaminated by radioactivity. The necessity of avoiding such contamination puts serious constraints on the permissible variations in the operating capacity of the system.

SUMMARY OF THE INVENTION

Accordingly, it is an object of this invention to provide improved methods for concentrating liquids and for separating liquid from gas.

Another object is to provide liquid concentration and gas separation processes that can operate efficiently over widely varying capacity ranges.

Another object is to provide for liquid-gas separation at a low pressure drop over widely varying gas flow velocities.

Another object is to provide for liquid-gas separation where the liquid is separated as the gas flows upwardly by natural convection.

Another object is to provide a liquid-gas separator that does not require centrifugal or turbulent motion of the gas.

Another object is to provide liquid-gas separation methods which are relatively efficient, durable, low-cost, simple to adjust and maintain, and which do not possess defects found in similar prior art methods and apparatus.

Another object is to provide improved methods for concentrating and disposing of radioactive waste.

Other objects and advantages of the invention will be revealed in the specification and claims, and the scope of the invention will be set forth in the claims.

DESCRIPTION OF THE DRAWING

The FIGURE is a partially cross-sectional schematic representation of a liquid concentrator and gas separator in accordance with this invention.

DESCRIPTION OF THE INVENTION

The drawing shows a system for concentrating a liquid, such as radioactive waste water or a solution of electrolytic caustic. The liquid being concentrated is fed through an inlet conduit 5 controlled by a valve 6 on a branch 7 connected to the input line 8 of a recirculation pump 9 powered by a motor 10. The liquid is pumped into the input line 11 of a conventional heat transfer unit 12 capable of heating the liquid until it vaporizes, or its aqueous component is transformed into steam. Liquid enters distribution header 13 and then passes through a first series of heat transfer pipes 14 into a header 15. The liquid then passes through a second series of heat transfer pipes 16 into a header 17, separated from header 13 by plate 18. While in heat transfer means 12, the liquid is heated to a temperature at which it will vaporize by a heat transfer fluid, such as steam, that passes through heat line 19 controlled by valve means 21 into a sealed enclosure 22 surrounding pipes 14 and 16. Steam condensate is removed from enclosure 22 through a line 23 controlled by valve means 24 and recirculated as a source of heat energy, or otherwise used or disposed of.

The superheated liquid leaves heat transfer means 12 through a line 25 and enters enclosure means such as a liquid-gas separator vessel 27 through a liquid-gas inlet 28 into the lower portion of vessel 27. Vapor generation is suppressed by valve 26, by the size of line 25 or by other means of creating back pressure that prevents boiling in tubes 14 and 16. Vessel 27 should be made from a corrosion resistant metal alloy such as stainless steel or titanium, or from fiberglass reinforced plastic. The lower pressure in vessel 27 causes the superheated liquid to vaporize. The gas and entrained liquid droplets (e.g., at 0.5 to 30 p.s.i.a.) flow essentially directly vertically upwardly from inlet 28 by natural convection and because of the lower pressure at gas outlet 29 in the upper portion of vessel 27. When passing from inlet 28 to outlet 29, all of the gas must flow in series through each of a plurality of vertically spaced liquid-gas separator pads 30, 31 and 32. The pads have different cross-sectional areas with pad 30, which is closest to gas inlet 28, having the largest cross-sectional area, and pad 32, which is closest to gas outlet 29, having the smallest cross-sectional area. Thus the liquid-gas separator pads having decreasing cross-sectional areas in the direction of gas flow.

Each of pads 30, 31 and 32 comprises one or more layers of interwoven wire mesh material. Such material should be made from corrosion resistant metal or plastic wires (e.g., stainless steel or Teflon) and can be obtained from A.C.S. Industries of Woonsocket, Rhode Island, as their Mister Mesh ® mesh pad entrainment separators. The wires may have a diameter of from about 0.006 to 0.011 inches, and the pads may have a density of from about 5 to 12 pounds per cubic foot. Each pad is securely held in place by suitable conventional support means, and together with baffles such as 33 when required, each pad completely spans and blocks vessel 27 at some predetermined cross-sectional level.

As the gas and entrained liquid droplets flow through pads 30, 31 and 32, the liquid droplets are removed by the impingement and coalescing principle. Such pads operate efficiently to remove liquid when the gas velocity through the pads is restricted to a narrow range above or below an optimum velocity (e.g., ± 10 feet per second at atmospheric pressure). When the gas velocity is outside the narrow range, the ability of a pad to remove liquid droplets is greatly reduced. This invention is especially suited for use with systems of widely varying capacity which would result in the volume of liquid fed to inlet conduit 5 fluctuating widely, and this would result in the volume of vaporized liquid flowing into vessel 27 through inlet 28 also varying widely.

In the embodiment shown in the drawing, middle pad 31 has a cross-sectional area (e.g., 10 square feet) sized to efficiently remove liquid at the design operating capacity of the system connected to inlet line 5, because the volume of gas flowing through vessel 27 per unit time at design capacity operation will result in the gas velocity through pad 31 that is optimum for removal of liquid droplets. Lowermost pad 30 is sized to remove liquid when the system is operating at greater than design capacity, and, for example, could have cross-sectional area of fifteen square feet to be at optimum efficiency when the system is operating 50% above design capacity. This increase in the cross-sectional area of pad 30 by 50% would result in the velocity of the gas passing through pad 30 at 50% greater operating output being the same as the velocity of the gas passing through pad 31 at design capacity because 50% greater volume of gas per unit of time passes through vessel 27 when design capacity is exceeded by 50%. Similarly uppermost pad 32 is sized to remove liquid when the system is operating at less than design capacity, and for example, could have a cross-sectional area of 5 square feet to be at optimum efficiency when the system is operating 50% below design capacity. This decrease in the cross-sectional area of pad 32 by 50% would result in the velocity of the gas passing through pad 32 at 50% reduced operating output being the same as the velocity through pad 31 at design capacity because the volume of gas passing through vessel 27 per unit time would be reduced by 50% in this situation. When the system is operating between 50% above design capacity and design capacity, or between 50% below design capacity and design capacity none of the pads will remove liquid at its optimum efficiency. However, the relative cross-sectional areas of the various pads are predetermined so that a combination of two or more pads will remove sufficient entrained liquid to attain the desired gas purity at the intermediate operating levels.

The tiny droplets of entrained liquid which impinge on any pad, coalesce into large drops which fall under the influence of gravity into a zone 34 at the bottom of vessel 27, from which they flow through liquid outlet line 36 to the inlet of pump 9 and are then returned to the liquid being superheated in heat transfer unit 12. The liquid impinged on a pad spaced vertically above another pad falls as large drops onto and passes through the lower pad without significantly affecting the operation of the separator, thus eliminating the need for special collecting devices or drains. Gas exiting through outlet 29 may be sent to a condenser, or may be vented to the atmosphere, or may be employed in another process. Periodically, after the liquid is concentrated beyond some predetermined limit, the concentrated liquid in heating means 12 is removed for further processing or disposal through a discharge line 37 controlled by a valve 38.

Any number of pads greater than one may be used, depending on the particular gas, liquid, operating pressure, velocity, system output capacity variations, and the criticality of essentially complete removal of liquid from discharged gas. This invention can be designed to handle variations in system output from 5 to 150%.

It has thus been shown that by the practice of this invention methods and apparatus of concentrating liquids and separating entrained liquid from gas can be specially tailored for use in variable output systems from which only very high purity vapor may be discharged, such as in the disposal of radioactive aqueous waste. This is accomplished without significantly increasing the pressure drop of the system and without requiring complicated or moving components subject to mechanical wear and deterioration. The use of a plurality of spaced separator devices, such as mesh pads, having cross-sectional areas that decrease in the direction of gas flow, permits almost unlimited flexibility in designing a system that will operate efficiently over a wide range of varying operating capacities.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A method of disposing of a variable volume flow of aqueous radioactive waste, comprising: heating the waste until the water component vaporizes; passing the vapors and any entrained radioactive water droplets at a varying range of velocities serially through a plurality of water droplet separators having decreasing cross-sectional areas in the direction of vapor flow; the velocity at which said vapors and entrained radioactive water droplets pass through said water droplet separators varying with said variable volume of flow; one of said water droplet separators having a relatively small cross-sectional area being most effective in removing radioactive water droplets when the vapor velocity is at the low end of said range, and another of said water droplet separators having a relatively large cross-sectional area being most effective in removing radioactive water droplets when the vapor velocity is at the high end of said range; removing decontaminated vapors; returning the radioactive water droplets to the waste being heated; and removing concentrated radioactive waste water for disposal.

2. The method of claim 1, wherein said vapors and entrained radioactive water droplets are passed vertically through said water droplet separators; and separated water falls under the influence of gravity into a radioactive water collecting zone from which it is returned to said waste being heated.

* * * * *